W. T. RUSSELL.
STRAINER.
APPLICATION FILED MAR. 2, 1908.
925,032.
Patented June 15, 1909.
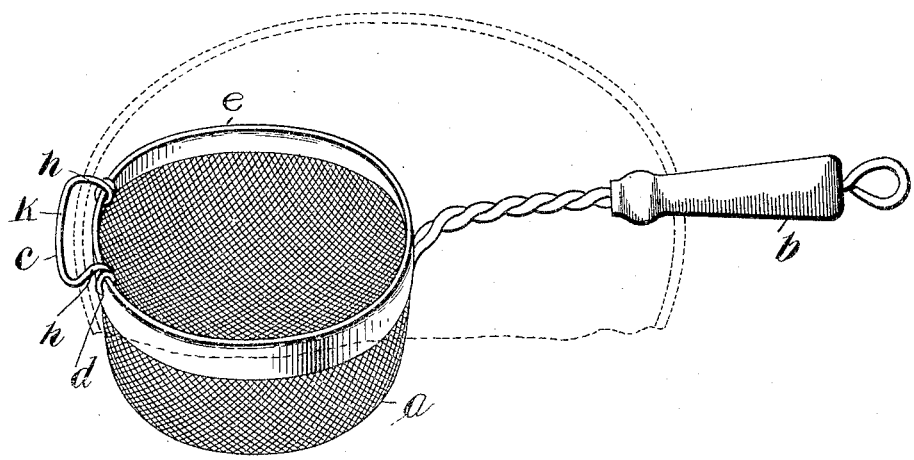
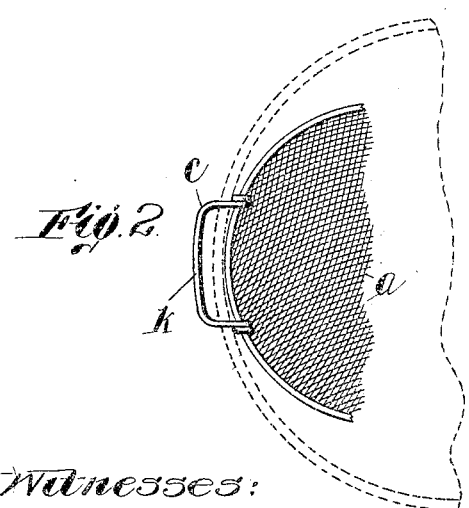
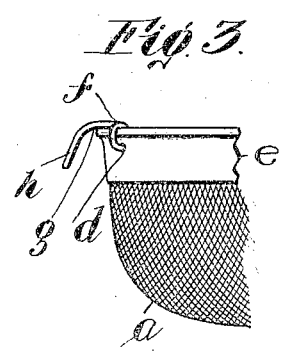
Witnesses:
C. F. Mason
M. E. Regan
Inventor:
W. T. Russell
By Attorneys
Southgate & Southgate

UNITED STATES PATENT OFFICE.

WILLIAM T. RUSSELL, OF WELLESLEY, MASSACHUSETTS.

STRAINER.

No. 925,032.  Specification of Letters Patent.  Patented June 15, 1909.

Application filed March 2, 1908.  Serial No. 418,689.

*To all whom it may concern:*

Be it known that I, WILLIAM T. RUSSELL, a citizen of the United States, residing at Wellesley, in the county of Norfolk and State of Massachusetts, have invented a new and useful Strainer, of which the following is a specification.

This invention relates to a strainer to be used for various purposes.

The principal object of the invention is to provide the strainer with improved means whereby it may be rested on the upper edge of a bowl or receptacle of any kind in such a way that it will not tip to the right or left; whereby the user may stir the contents of the strainer with one hand while pouring with the other, said means being constructed in a single integral piece, whereby its manufacture is improved and simplified.

Further objects and advantages of the invention will appear hereinafter.

It is so constructed that the strainer has three points of support in a plane but not in a straight line, two of them being at one end of the strainer and the other beyond the opposite end. The third point is furnished by the handle and does not require any special construction.

Reference is to be had to the accompanying drawings which show a preferred form of the invention, in which—

Figure 1 is a perspective view. Fig. 2 is a plan showing how the device can rest on a receptacle, and Fig. 3 is an elevation showing the form of the rest.

The invention may be applied to any ordinary form of strainer $a$ having a handle $b$ of the usual or any desired construction. This handle ordinarily projects from near the top of the strainer at one side and in position nearly horizontal when the strainer is in position for use. In order to provide a rest for the strainer which will give two points of support on one side close to the strainer and forming, with the handle, a three-point support for the entire device, the side or end of the strainer opposite the handle is provided with a rest or clip $c$, preferably constructed of a single piece of wire passed through perforations $d$ in the upper ring $e$ of the strainer and coiled around the top of the same at both ends. The wire extends directly outward from the top of the coils $f$ a short distance thus forming a supporting surface $g$ and then dips downwardly to form a sort of hook $h$. The lower ends of the two hooks are connected by a cross-bar $k$ which integrally unites the two parts of the rest.

It will be seen that with this construction, there is a substantially horizontal surface $g$ projecting from the top of the end of the strainer which extends downwardly so that the strainer may be mounted on a dish of any kind in such a way that the two horizontal portions will rest conveniently upon it and prevent any tipping of the strainer from the ordinary causes met with in the use of such articles. Moreover, on account of the slanting inner surfaces of the hooks $h$, it will be found that it is not necessary to exercise any special care in placing the article in position, as these surfaces will readily engage the top of the dish to which the strainer is to be applied and guide it into proper position. They project far enough to prevent displacement of the strainer rearwardly and the edge of the strainer itself of course prevents displacement in the opposite direction. Tipping is prevented by the fact that the two horizontal surfaces $g$ are sufficiently far apart to afford a firm rest together with the handle $b$ which may rest on the opposite side of the dish.

It is well known that it requires three points to determine a plane and that it requires the same number of points to firmly support an article on a plane. Advantage has been taken of this fact in a most simple manner in this invention to provide a firm support for the strainer and at the same time furnish a loop $k$ by which the strainer may be hung up in practice if desired, with an exceedingly simple and inexpensive construction.

While I have illustrated and described the invention as applied in a particular way, I am aware that many modifications may be made therein without departing from the scope of the invention as expressed in the claims. Therefore, I do not wish to be limited to the exact details of construction shown, but What I do claim is:—

1. As an article of manufacture, a strainer comprising a foraminous bottom and sides, and a sheet metal ring at the top thereof and having near the top of one side thereof a rest consisting of a single integral piece of wire, the ends of which extend through said ring and are secured thereto at a material distance apart so as to form two separate supports, and extend outwardly from the top of the ring and downwardly, the downward extensions being connected by a cross bar formed from the wire extending part way around the ring parallel therewith and spaced from the edge of the ring so that the strainer may be suspended therefrom as from a hook, whereby the strainer may be applied to the upper edge of a dish or the like so as to have a firm support and so that the edge of the dish will extend between the side of the strainer and the downward extensions to prevent the strainer from tipping and horizontal displacement in either direction, and a handle located on the upper part of the strainer directly opposite said rest, whereby a three-point support is provided.

2. As an article of manufacture, a strainer comprising a foraminous bottom and sides, and a sheet metal ring at the top thereof and having near the top of one side thereof a rest consisting of a single integral piece of wire, the ends of which extend through said ring and are secured thereto at a material distance apart so as to form two separate supports, and extend outwardly from the top of the ring and downwardly, the downward extensions being connected by a cross bar formed from the wire extending part way around the ring parallel therewith and spaced from the edge of the ring, whereby the strainer may be applied to the upper edge of a dish or the like, so that the edge of the dish will extend between the side of the strainer and the downward extensions to prevent the strainer from tipping and horizontal displacement in either direction.

In testimony whereof I have hereunto set my hand, in the presence of two subscribing witnesses.

WILLIAM T. RUSSELL.

Witnesses:
ALBERT E. FAY,
ELIZABETH M. ALLEN.